United States Patent [19]

Hagiwara

[11] 4,131,354
[45] Dec. 26, 1978

[54] SELECTIVE MODE ANGLE FINDER FOR SLR CAMERA

[75] Inventor: Teruo Hagiwara, Kawagoe, Japan

[73] Assignee: Asahi Kogaku Kogyo Kabushiki Kaisha, Tokyo, Japan

[21] Appl. No.: 784,758

[22] Filed: Apr. 5, 1977

[30] Foreign Application Priority Data

Apr. 7, 1976 [JP] Japan .................................. 51/42702

[51] Int. Cl.² ...................... G02B 23/14; G03B 13/08; G03B 19/12
[52] U.S. Cl. ....................................... 354/224; 350/49; 354/152
[58] Field of Search .............................. 254/150–155, 254/219, 223–225, 53, 54; 350/39, 49

[56] References Cited

U.S. PATENT DOCUMENTS

| 2,284,757 | 6/1942 | Morton | 354/224 |
|---|---|---|---|
| 2,435,074 | 1/1948 | Fry | 350/49 X |
| 2,974,573 | 3/1961 | Faasch | 354/151 |
| 3,643,573 | 2/1972 | Hiruma | 354/152 X |
| 3,881,804 | 5/1975 | Ikeda | 354/224 X |
| 3,890,627 | 6/1975 | Uno | 354/155 X |

Primary Examiner—Donald A. Griffin
Attorney, Agent, or Firm—Sughrue, Rothwell, Mion, Zinn and Macpeak

[57] ABSTRACT

An angle finder housing 8 attachable to the viewfinder eye piece 6 of an SLR camera mounts a bent axis telescopic optical system 8a–8d and a rotatable revolver cylinder 7 offset from but parallel to the optical axis. The cylinder 7 has a through passage 7b, a magnifying lens 7c, and a solid portion 7d spaced from but parallel to each other, whereby the cylinder may be selectively rotated to dispose the passage, the magnifying lens, or the solid portion in the optical axis to implement picture composition, accurate focusing, or reverse incident light blockage, respectively.

6 Claims, 5 Drawing Figures (A)

(B)

(C)

SELECTIVE MODE ANGLE FINDER FOR SLR CAMERA

BACKGROUND OF THE INVENTION

This invention relates to an apparatus for selectively magnifying or shielding the viewfinder image of a camera.

In order to observe a viewfinder image with a camera held at waist level through a typical penta prism viewfinder optical system of a single lens reflex camera, an angle finder must be connected to the viewfinder eye piece to enable sighting from above. Where close-up photography or accurate focusing is involved, on the other hand, a magnifier is attached to the eye piece, and after the visual field of the magnifier is suitably set, the camera lens is adjusted to accurately bring the object into focus. When this is done through a magnifier, whose magnification is generally on the order of 1.5 to 3, only a central portion of the finder image is observed through the magnifier. That is, it is impossible to observe the entire photographic field seen by the viewfinder. Therefore, after a photographic composition has been determined by visually observing the field through an angle finder, the latter must be disconnected from the viewfinder eye piece and the magnifier connected thereto to accurately focus the object. During such exchange, however, the composition of the object may vary, and therefore it may be necessary to readjust both the composition and the focus. Such alternate use of an angle finder and a magnifier is obviously troublesome.

Further, in self-timed or multiple copy photography using an SLR camera having an automatic exposure control system and TTL metering, it is impossible to photograph the object with the operator's eye on the eye piece of the angle finder, whereby reverse incident light may enter the camera through the eye piece and adversely affect the exposure value.

SUMMARY OF THE INVENTION

According to this invention both the magnification and shielding of a viewfinder image are implemented by turning an annular revolver cylinder in which a magnifying lens, a through hole, and a light shield are disposed. The revolver cylinder is mounted in a cylindrical housing provided with a telescopic optical system and adapted to be connected to the viewfinder eye piece of an SLR camera, whereby the entire field of the viewfinder can be observed to determine the photographic composition, and the magnification can then be increased to implement accurate focusing. Conversely, the composition can be determined by observing the entire visual field after accurate focusing has been achieved, and if necessary the viewfinder image can be easily shielded.

An angle finder is known in the prior art in which a cylindrical body holding a magnifying lens is disposed before a telescopic optical system, and a transparent hole is provided in the cylindrical body in such a manner as to be perpendicular to the optical axis of the magnifying lens. The cylindrical body may be rotated with the aid of external means to switch between the magnifying lens and the transparent hole, to thereby magnify the viewfinder image. In this conventional angle finder, however, only two viewfinder images, i.e., a direct image and a magnified image, can be obtained. In the present invention, on the other hand, since the annular revolver cylinder is incorporated directly in the angle finder, several degrees of magnification can be provided.

DETAILED DESCRIPTION OF THE PREFERRED EMBODIMENT

Figure 1:
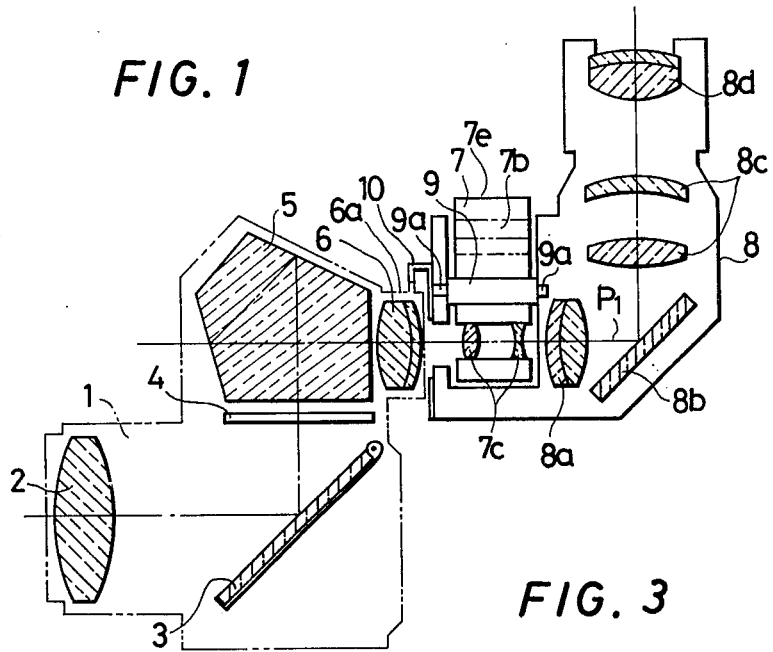
FIG. 1 shows a sectional view illustrating an optical system wherein a revolving magnification varying apparatus according to this invention is mounted on an SLR camera.
Figure 2:
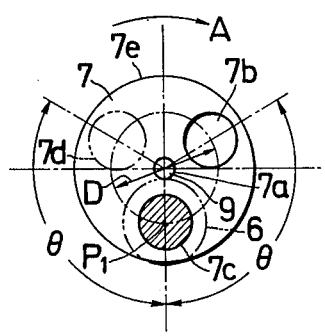
FIG. 2 shows a plan view of an annular revolver cylinder.

Referring now to FIG. 1, reference numeral 1 designates a camera body mounting a photographic lens 2, a movable reflex mirror 3, a focus glass 4, a penta prism 5, and a viewfinder eye piece (ocular lens) 6. Reference numeral 7 designates an annular revolver cylinder, an end view of which is shown in FIG. 2. The cylinder 7 has an axial hole 7a through its center, an open through hole or passage 7b, a non-focusing magnifying lens 7c, and a solid, light shielding portion 7d. The passage 7b, lens 7c, and shielding portion 7d are arranged at optional angular intervals $\theta$ on the circumference of a circle D coaxial with the center hole 7a. Reference numeral 8 designates a cylindrical housing mounting a telescopic system optically aligned with the eye piece 6. A shaft 9 in the housing rotatably extends through the axial hole 7a such that the circumference of the concentric circle D is positioned on the optical axis $P_1$ between the eye piece 6 and the telescopic system, and the cylinder is secured by the end portions 9a of the shaft 9 to the side walls of the housing 8 in such a manner that the cylinder axis is parallel to the optical axis or path $P_1$. The front portion 10 of the housing 8 is detachably fastened to the frame of the camera eye piece 6.

Mounted within the cylindrical housing 8 are the objective lens 8a of the telescopic optical system, which confronts the eye piece 6, a reflecting mirror 8b positioned behind the objective lens and positioned at an angle of 45° to the optical path $P_1$, and convex objective lenses 8c disposed above the mirror. To complete the teloscopic system, an adapter eye piece 8d is provided above the lenses 8c, and this eye piece is rotationally adjustable along the optical path in the usual manner.

Part of the outer wall or periphery 7e of the cylinder 7 protrudes from the housing 8, whereby the cylinder can be easily rotated or revolved about the shaft 9 as shown by the arrow A in FIG. 2. Thus, the through hole 7b, the magnifying lens 7c, and the shielding portion 7d can be selectively, axially positioned coincident with the optical axis $P_1$ by sequentially rotating the cylinder 7 through the spacing angle $\theta$.

Figure 3:
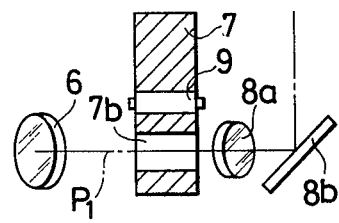
FIGS. 3A, 3B and 3C show side sectional views for describing the use of the apparatus according to this invention.
Figure 3:
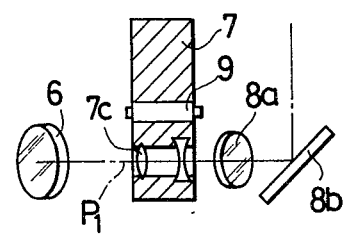
Figure 3:
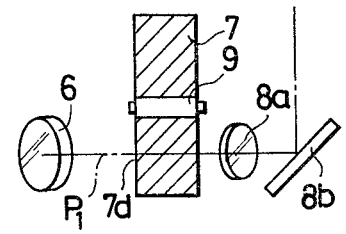

If the hole 7b is positioned on the optical axis $P_1$, as shown in FIG. 3A, the viewfinder image can be observed through only the telescopic optical system. If the cylinder is rotated so that the magnifying lens 7c is positioned on the optical axis $P_1$, as shown in FIG. 3B, the viewfinder image observed is magnified by both the lens 7c and the telescopic optical system. For self-timed photography, close photography, and copy photography where exposure variations may be caused by reverse incident light entering the camera body through the eye piece 6, if the cylinder 7 is turned to a position whereat the shielding portion 7d is positioned on the optical axis $P_1$, as shown in FIG. 3C, the optical path into the eye piece is blocked and suitable automatic exposure control can be obtained.

Thus, according to the present invention switching between a viewfinder image composition mode and a more highly magnified focus control mode may be easily implemented by simply rotating the revolver cylinder 7, and in self-timed or copy photography any reverse incident light can be completely blocked from the camera eye piece. As is obvious, the cylinder 7 is not limited to just three modes (normal, blocked, magnified), but two or more magnification modes of varying degrees may be provided, as well as various filter modes.

What is claimed is:

1. A selective mode viewfinder attachment for a single lens reflex camera, comprising:
    (a) a bent cylindrical housing member having an L-shaped cross-section and open at both ends,
    (b) a mirror disposed in the housing member to define an optical axis therethrough from one end to the other having an angular bend of approximately 90°,
    (c) a telescopic optical system disposed in the housing member in alignment with the optical axis,
    (d) a cylinder member rotatably mounted in the housing member about an axis parallel to but offset from the optical axis, said cylinder member including a solid portion selectively alignable with the optical axis of the attachment to thereby block any reverse incident light from entering the viewfinder eyepiece,
    (e) a pair of spaced passages defined in the cylinder member and extending longitudinally therethrough parallel to the cylinder axis and radially spaced therefrom a distance equal to the offset distance between the cylinder axis and the optical axis,
    (f) magnifying lens means disposed in one of the passages, and
    (g) means for attaching one end of the housing member to the viewfinder eyepiece of an SLR camera in alignment with the optical axis thereof, whereby picture composition and accurate focusing may be implemented by rotating the cylinder member to align a selected one of the passages with the optical axis of the attachment.

2. A viewfinder attachment as defined in claim 1, wherein a portion of the cylinder member protrudes from the housing member to implement its manual rotation.

3. A viewfinder attachment as defined in claim 2, wherein the cylinder member is disposed between the mirror and said one end of the housing member, and the mirror is disposed within the telescopic optical system.

4. A viewfinder attachment as defined in claim 3, wherein the telescopic optical system includes an adjustable eye piece disposed at the other end of the housing member.

5. A viewfinder attachment as defined in claim 1, wherein the cylinder member is disposed between the mirror and said one end of the housing member, and the mirror is disposed within the telescopic optical system.

6. A viewfinder attachment as defined in claim 1, wherein the telescopic optical system includes an adjustable eye piece disposed at the other end of the housing member.

* * * * *